United States Patent
Matsuura et al.

(10) Patent No.: US 6,882,402 B2
(45) Date of Patent: Apr. 19, 2005

(54) LIQUID CRYSTAL DISPLAY DEVICE AND METHOD FOR MAKING

(75) Inventors: Hiroyasu Matsuura, Tokyo (JP); Hitoshi Azuma, Tokyo (JP); Toshiyuki Koshita, Tokyo (JP); Mitsuaki Shiba, Tokyo (JP); Tsuneo Okada, Tokyo (JP)

(73) Assignee: Hitachi, Ltd. (JP)

( * ) Notice: Subject to any disclaimer, the term of this patent is extended or adjusted under 35 U.S.C. 154(b) by 122 days.

(21) Appl. No.: 10/001,087

(22) Filed: Oct. 31, 2001

(65) Prior Publication Data

US 2002/0063846 A1 May 30, 2002

(30) Foreign Application Priority Data

Nov. 29, 2000 (JP) ........................................ 2000-363295

(51) Int. Cl.⁷ ........................... G02F 1/13; G02F 1/1339
(52) U.S. Cl. ...................................... 349/187; 349/190
(58) Field of Search ................................. 349/187, 190

(56) References Cited

U.S. PATENT DOCUMENTS 5,607,009 A * 3/1997 Turner et al. .............. 165/48.1
6,436,482 B2 * 8/2002 Katsumata ................. 427/493
6,459,467 B1 * 10/2002 Hashimoto et al. ......... 349/153

FOREIGN PATENT DOCUMENTS

| JP | 09041139 | * | 2/1997 | ........... C23C/14/50 |
| JP | 11337954 | * | 12/1999 | ......... G02F/1/1339 |
| JP | 2000 199908 | * | 7/2000 | ......... G02F/1/1339 |
| JP | 2002 110507 | * | 4/2002 | ......... H01L/21/027 |

* cited by examiner

*Primary Examiner*—Toan Te
*Assistant Examiner*—Jeanne Andrea Di Grazio
(74) *Attorney, Agent, or Firm*—Townsend and Townsend and Crew LLP

(57) ABSTRACT

Glass substrates interposed by unhardened thermosetting sealing material is surrounded by two sheets. The space between the sheets is placed in a roughly sealed state and decompressed to produce at least a partial vacuum between the sheets. The sheets serve to press the glass substrates against the sealing material by the pressure difference relative to the atmospheric pressure. One or more heaters spaced apart from the sheets heat the glass substrates and the sealing material, setting the sealing material.

37 Claims, 14 Drawing Sheets

(Before softening of sealing material)

(After softening of sealing material)

(a)

(b)          (c)

Glass substrate temperature difference

LIQUID CRYSTAL DISPLAY DEVICE AND METHOD FOR MAKING

CROSS-REFERENCES TO RELATED APPLICATIONS

This application is related to and claims priority from Japanese Patent Application No. 2000-363295, filed on Nov. 29, 2000.

BACKGROUND OF THE INVENTION

The present invention relates to a technology for fabricating liquid crystal panels equipped with glass substrates for holding liquid crystal.

Conventionally, liquid crystal panels hold liquid crystal between two glass substrates. For example, in thin-film transistor (TFT) panels, a color filter, transparent electrodes, and thin-film transistors are formed on the glass substrates and a roughly constant gap is maintained between the glass substrates by spacers. The liquid crystal filling the space between the substrates is kept in a sealed state by a sealing material. Thus, in producing liquid crystal panels a sealing material is disposed on at least one of the two glass substrates to surround the area that will be filled by the liquid crystal. Then, the two glass substrates are processed to form a composite structure. In this processing, spacers uniformly come into contact with the two glass substrates, and the sealing material is squeezed between the substrates in the display area and hardened so that a uniform gap is formed. After the sealing material is hardened, the liquid crystal is placed into the region surrounded by the sealing material. In the conventional technology, if a thermosetting resin is used as the sealing material, the gap between the two glass substrates is usually formed using one of the following three methods. (1) Two flat heaters are placed on either side of the glass substrates and pressure is applied. (2) The glass substrates are placed on a plate and a sheet is covered and sealed over this. Air is discharged to form a vacuum so that the pressure difference with atmospheric pressure causes pressure to be applied to the glass substrates. The substrates are heated by a heater disposed on the plate, a hot-air furnace, or the like. (3) The glass substrates are covered and sealed from either side by sheets. A vacuum is formed so that the pressure difference with the atmospheric pressure causes pressure to be applied to the glass substrates. The substrates are heated with a hot-air furnace or the like.

In method (1), larger substrate areas require application of greater pressure, thus making the device larger. As a result, the method is not suited for clean-room production. Also, the glass substrates are rapidly heated and pressurized so that the discharge of air from between the glass substrates may not be performed quickly enough, resulting in variations in the gap between the substrates. Also, if the pressure is increased to promote discharge of air, the internal pressure increases, causing the sealing material to pop or offsets to be generated between the glass substrates. In method (2), if the plate is heated ahead of time, the one-sided application of heat results in a temperature difference between the glass substrates. Differences in thermal expansion can lead to warping and shifts in the glass substrates. Also, if the plate is heated after the glass substrates are mounted, the heating of the plate itself takes time. The same issues apply if a hot-air furnace is used. Method (3) also involves a delay for heating.

It is an object of the present invention to provide a liquid crystal panel technology that can overcome the problems described above.

BRIEF SUMMARY OF THE INVENTION

In accordance with the invention, a method and system of producing liquid crystal panels includes providing a pair of glass substrates having a pattern of thermosetting sealing material disposed between the substrates. The substrates are pressed together. In one aspect of the invention, the substrates are pressed together by being placed between a pair of sheets. The space between the sheets is placed in a roughly sealed state and decompressed to produce at least a partial vacuum between the sheets. At least one of the heaters is placed proximate to and in spaced apart relation from the sheets. The heaters heat the glass substrates and the sealing material, thereby setting the sealing material.

DESCRIPTION OF THE SPECIFIC EMBODIMENTS

Figure 1:
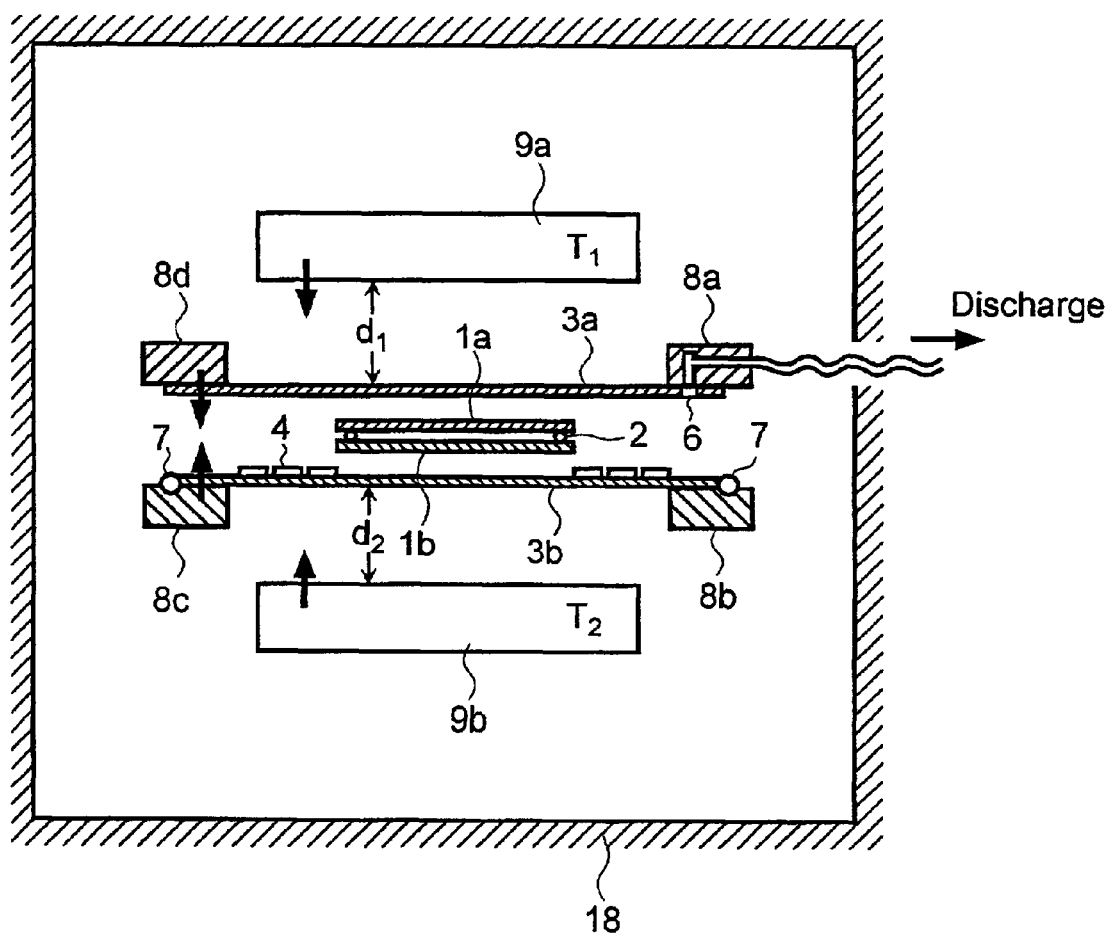
FIG. 1 is a drawing showing the architecture of a glass substrate processing module in a liquid crystal panel production device according to a first embodiment of the present invention.

Brief descriptions of various illustrative embodiments of the present invention will be described first.

In one embodiment of the invention, a method is disclosed for producing liquid crystal panels equipped with glass substrates for holding liquid crystal producing liquid crystal panels forming a composite structure with glass substrates including: a first step for disposing a thermosetting sealing material between the glass substrates; a second step for surrounding the sealing material and the glass substrates with sheets and forming a roughly sealed state between the sheets; a third step for discharging air from between the sheets, pressurizing the glass substrates via the sheets using a pressure difference with atmospheric pressure, and heating the sheets, the glass substrates, and the thermosetting sealing material using heaters disposed out from the sheets and separated from the sheets by a space; a fourth step for releasing a space between the sheets to atmospheric pressure; and a fifth step for retracting the sheets from the glass substrates.

In a particular embodiment of the second step, two sheets are used as the sheets, and the two sheets are moved toward the glass substrates from either side to surround the glass substrates. In another particular embodiment of the third step, heating temperature can be varied by adjusting heater temperature or heater position. In still another particular embodiment of the third step, the discharging operation keeps the space between the sheets in a decompressed state until a temperature of the thermosetting sealing material reaches a softening point.

In another illustrative embodiment of the present invention, a liquid crystal panel production device is disclosed for producing liquid crystal panels equipped with glass substrates for holding liquid crystal, a liquid crystal panel production device including: means for moving sheets from outside the glass substrates interposed by a thermosetting sealing material and surrounding the sealing material and the glass substrates with the sheets, forming a roughly sealed state between the sheets; means for decompressing discharging air from between the sheets and decompressing a space between the sheets; means for heating the sheets, the glass substrates, and the thermosetting sealing material from a position outside of the sheets and separated from the sheets by a space; and a controller equipped with a structure capable of controlling the sheet moving means, the decompressing means or the heating means; wherein the glass substrates are pressurized via the sheets using a pressure difference with atmospheric pressure, the thermosetting material is hardened by heating, and a composite structure is formed from the glass substrates for holding liquid crystal.

In still another illustrative embodiment of the invention, a liquid crystal panel production device is disclosed for producing liquid crystal panels equipped with glass substrates for holding liquid crystal, a liquid crystal panel production device including: means for transporting and aligning to a predetermined position glass substrates interposed by a thermosetting sealing material; means for moving sheets from outside the glass substrates interposed by the thermosetting sealing material and surrounding the sealing material and the glass substrates with the sheets, forming a roughly sealed state between the sheets; means for decompressing discharging air from between the sheets and decompressing a space between the sheets; means for heating the sheets, the glass substrates, and the thermosetting sealing material from a position outside of the sheets and separated from the sheets by a space; means for cooling the sheets or the heating means; and a controller equipped with a structure capable of controlling the transporting means, the sheet moving means, the decompressing means, the heating means, or the cooling means; wherein the glass substrates are pressurized via the sheets using a pressure difference with atmospheric pressure, the thermosetting material is hardened by heating, and a composite structure is formed from the glass substrates for holding liquid crystal.

In a particular embodiment, the controller controls the decompressing means and/or the heating means so that air is discharged from between the sheets to form a predetermined decompressed state by the time a temperature of the thermosetting sealing material reaches a softening point. In another particular embodiment, the sheet moving means supports two sheets, and the two sheets are moved toward the glass substrates from either side to surround the glass substrates. In still another particular embodiment, the sheet moving means includes a plurality of sheet support sections that retract the sheets from either side of the glass substrates, and during the retraction operation, a subset of the plurality of sheet support sections is retracted so that a distance from the glass substrate and the sheet is different from the distance for other support sections. In a particular embodiment, the heating means allows variable distances from the sheet, the glass substrates, and the thermosetting sealing material to a heat source.

In another illustrative embodiment of the invention, a liquid crystal display device is disclosed with a display section equipped with a liquid crystal panel produced using any of the foregoing described production methods, the display section displaying images driven by video signals from a drive circuit.

In another illustrative embodiment of the invention, there is disclosed a storage medium storing a program containing the following steps for producing liquid crystal panels equipped with glass substrates for holding liquid crystal, a thermosetting sealing material being interposed between the glass substrates: a first step for surrounding the sealing material and the glass substrates with sheets and forming a roughly sealed state between the sheets; a second step for discharging air from between the sheets, pressurizing the glass substrates via the sheets using a pressure difference with atmospheric pressure, and heating the sheets, the glass substrates, and the thermosetting sealing material using heaters disposed out from the sheets and separated from the sheets by a space; a third step for releasing a space between the sheets to atmospheric pressure; and a fourth step for retracting the sheets from the glass substrates.

In another illustrative embodiment, the foregoing described operations are performed in an overlapping manner over time.

The following is a more detailed description of the foregoing briefly discussed embodiments of the present invention, with references to the drawings.

Figure 2:
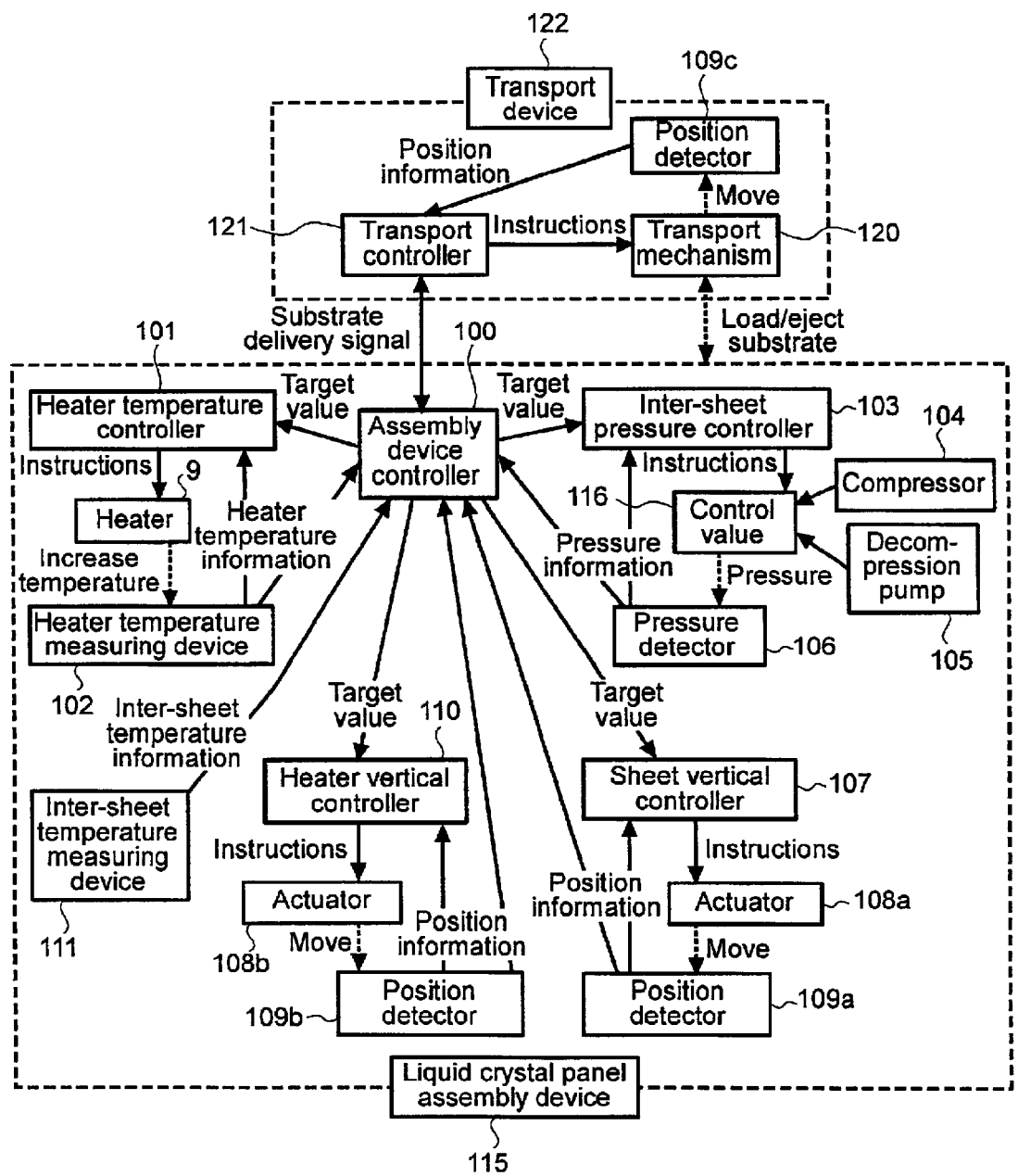
FIG. 2 is a drawing showing the overall architecture of a control system in a liquid crystal production device according to a first embodiment of the present invention.
Figure 3:
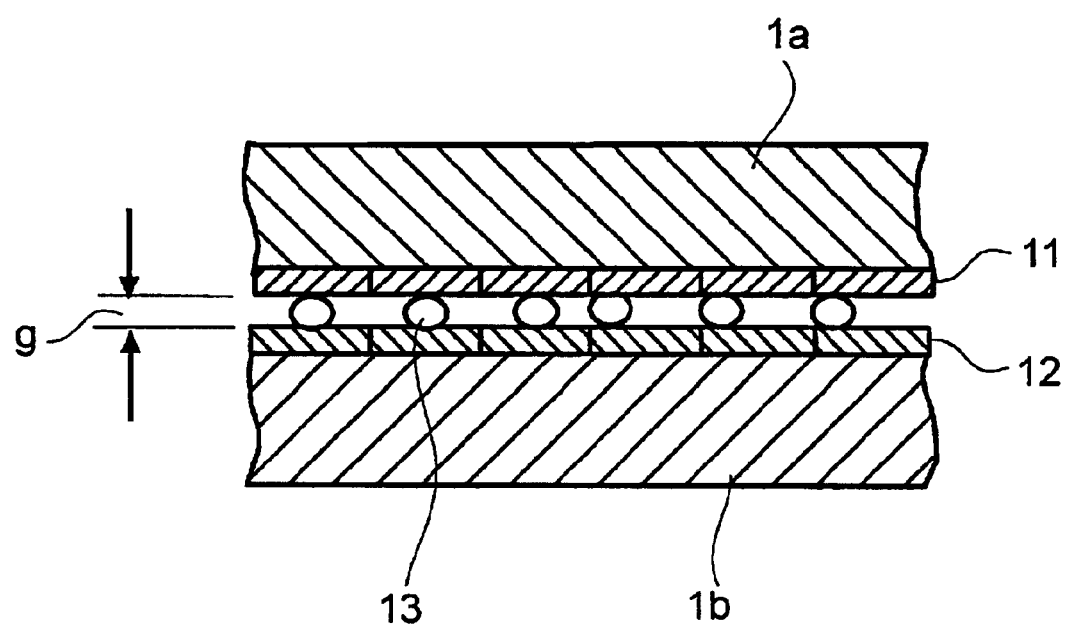
FIG. 3 shows a drawing illustrating the cross-section of a liquid crystal panel produced with the present invention.
Figure 4:
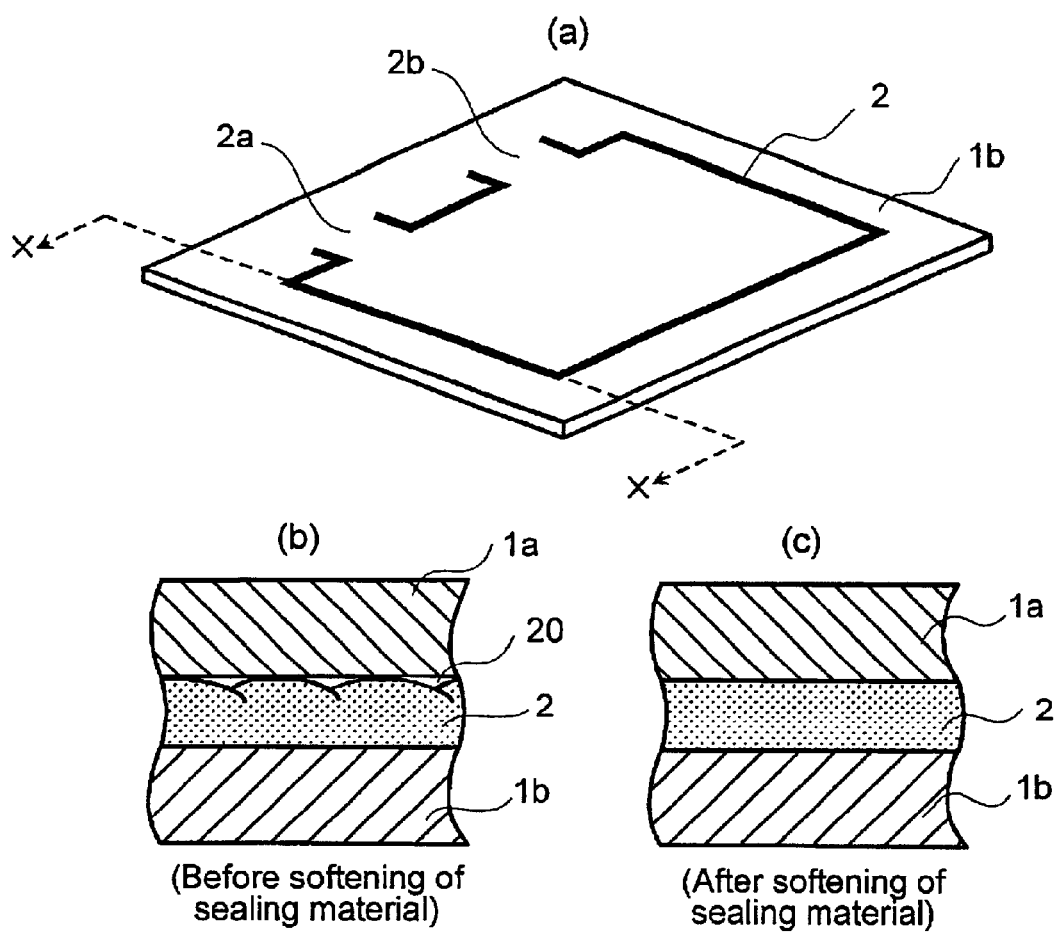
FIG. 4 are drawings illustrating the states of the heated thermosetting sealing material according to the present invention.
Figure 5:
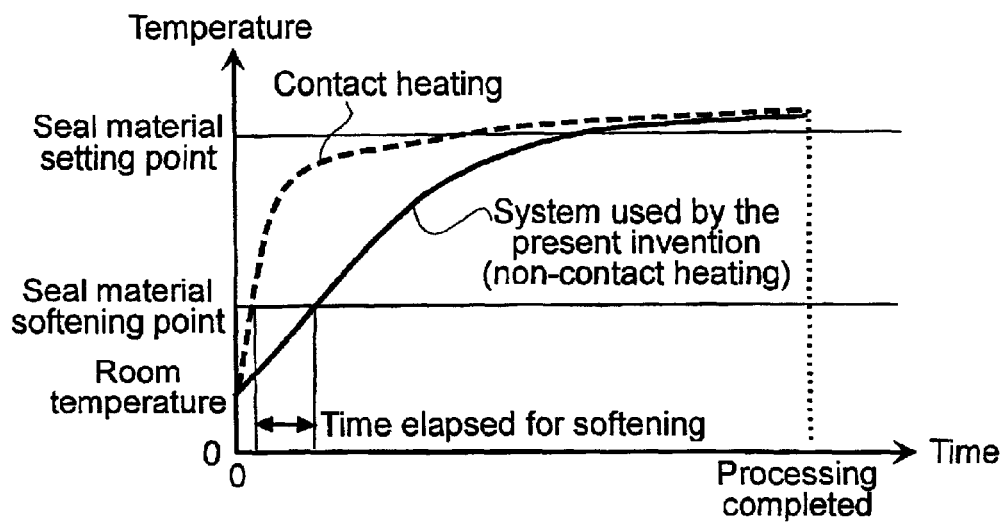
FIG. 5 is a drawing illustrating sample temperature increase characteristics of a thermosetting sealing material according to the present invention.
Figure 6:
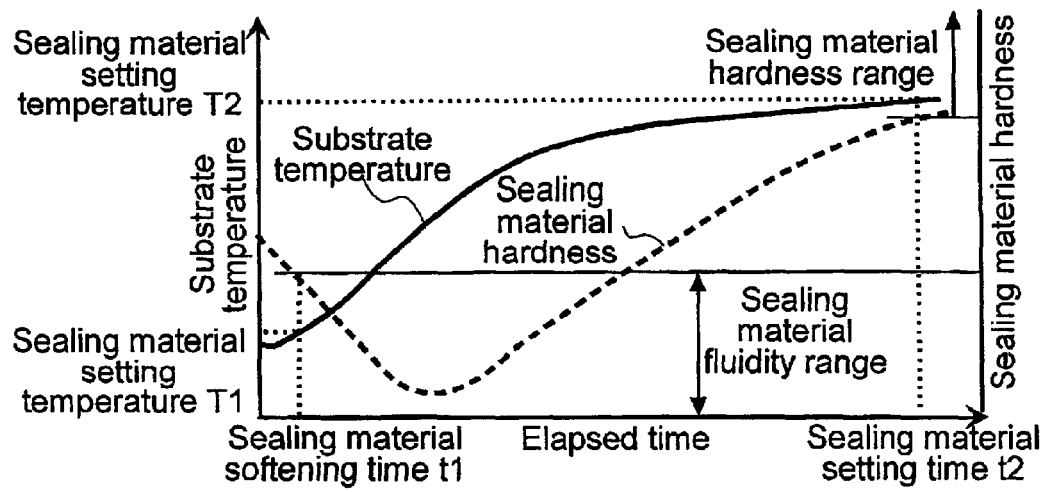
FIG. 6 shows a drawing illustrating sample temperature increase characteristics of glass substrates and sample hardening characteristics of a thermosetting sealing material according to the present invention.
Figure 7:
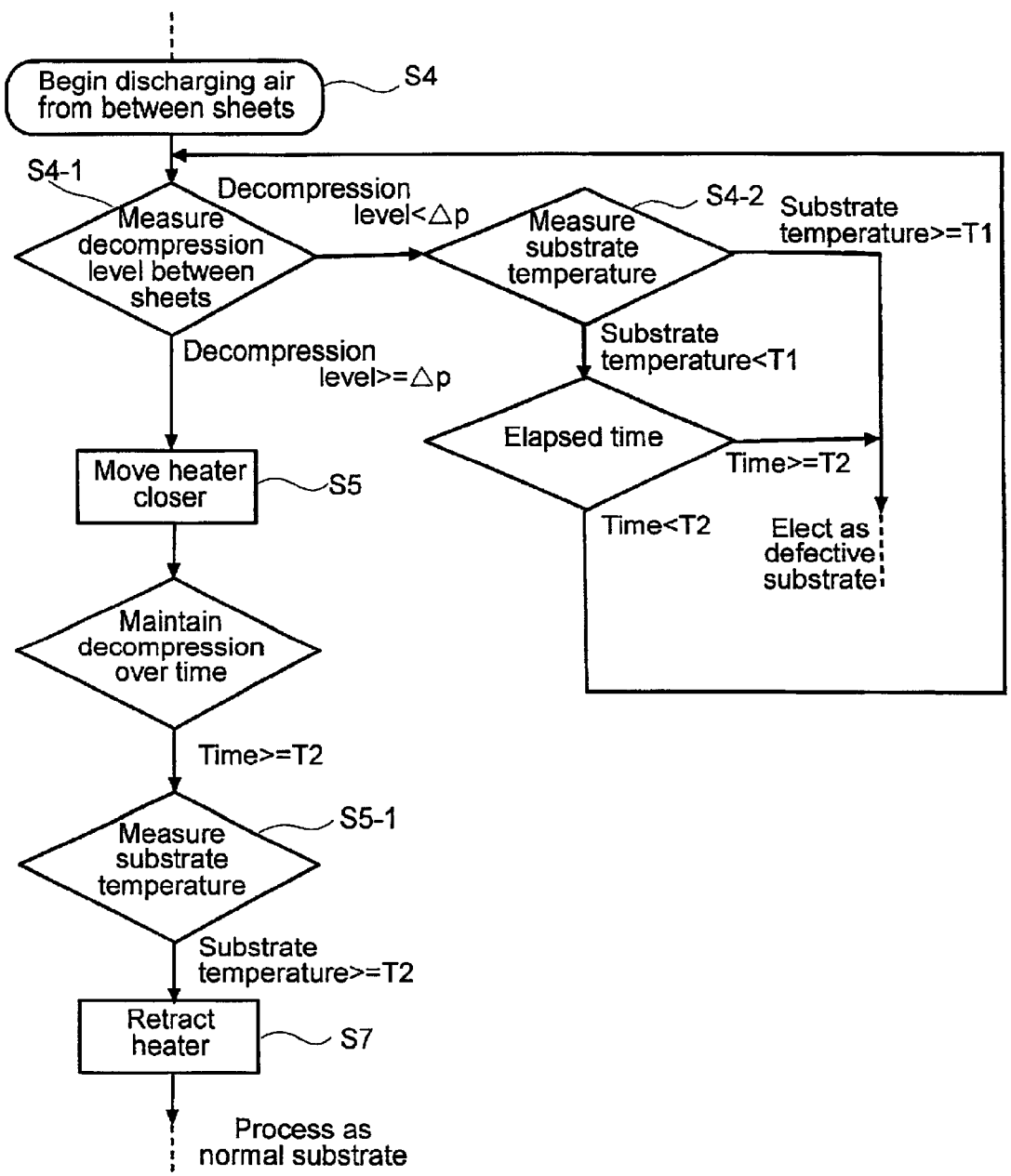
FIG. 7 is a drawing showing a sample sequence for discharging/decompressing operations and heating operations.
Figure 8:
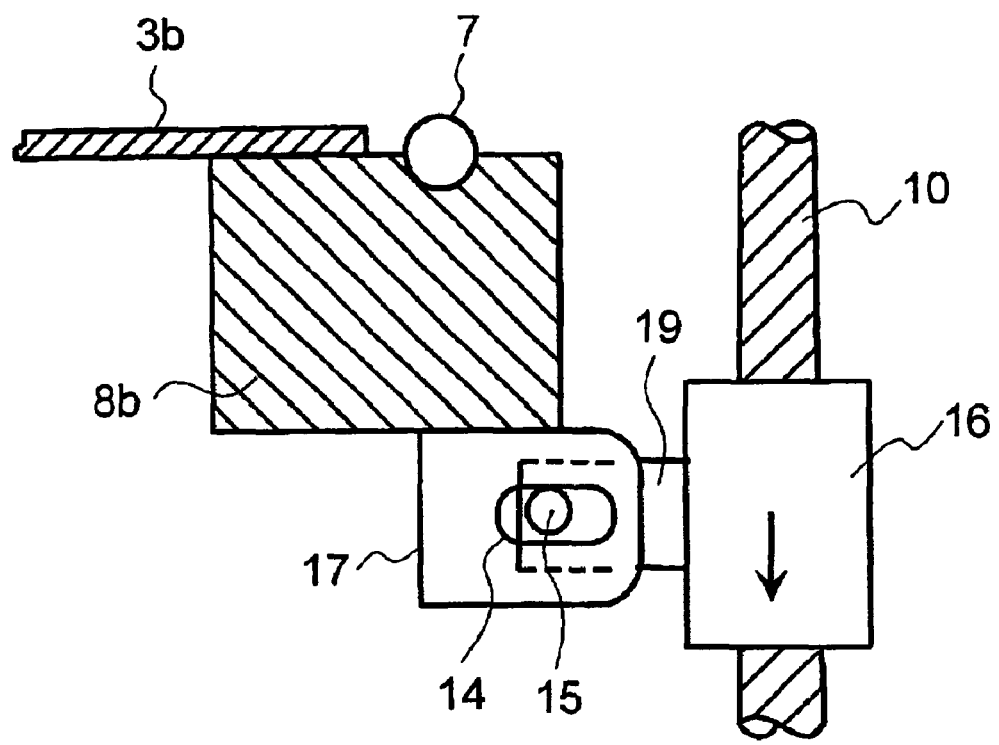
FIG. 8 is a drawing showing a sample structure for an actuator section used to move sheet support members according to the present invention.
Figure 9:
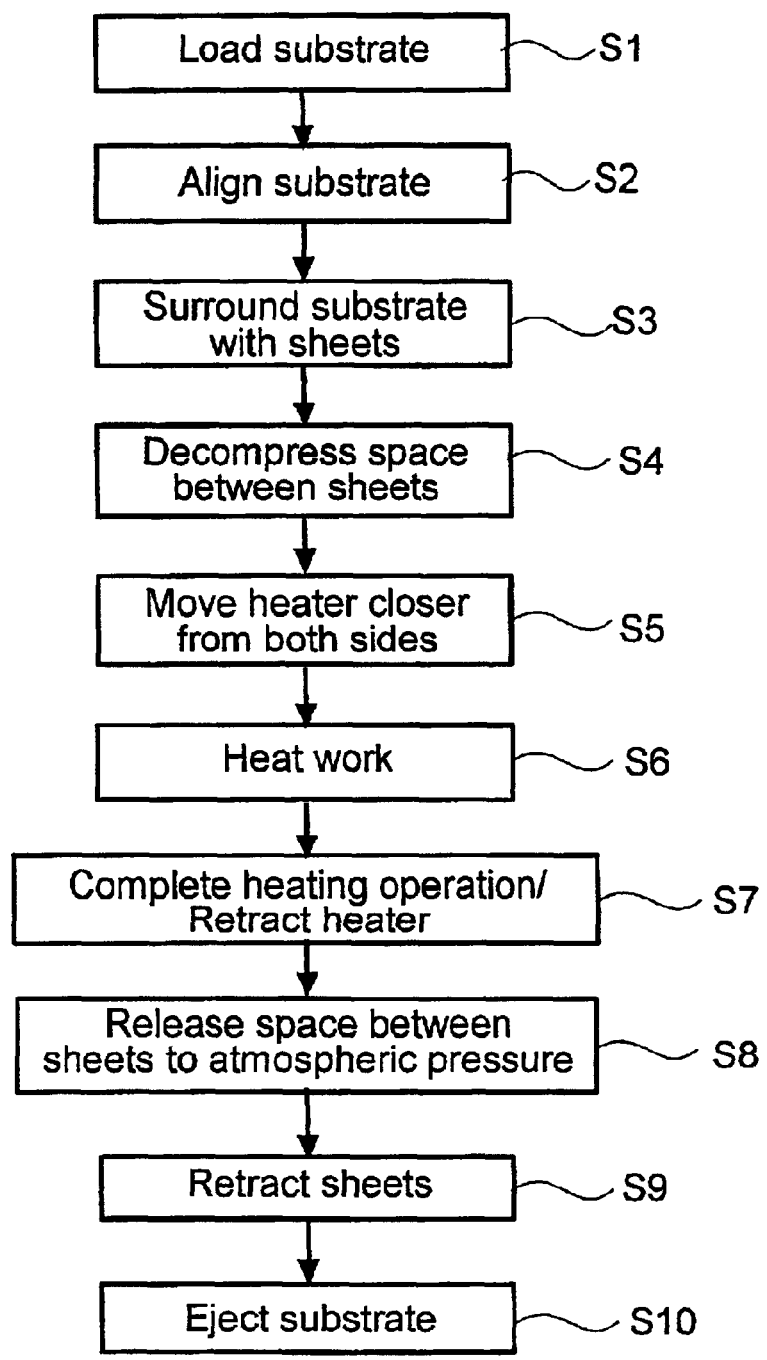
FIG. 9 is a drawing showing a sample sequence of operations from the loading of a substrate to ejection.

FIG. 1 through FIG. 9 are drawings for the purpose of describing the first embodiment of the present invention. FIG. 1 is a cross-section drawing showing the architecture of a glass substrate processing module in a liquid crystal panel production device. FIG. 2 is a block diagram showing the overall architecture of a control system of a liquid crystal panel production device according to the first embodiment of the present invention. This architecture provides control for various sections including the glass substrate processing module and peripheral modules thereof. FIG. 3 shows a cross-section of a section of a liquid crystal panel produced with the technology of the present invention. A section without a thermosetting material is shown. FIG. 4 shows different states of a thermosetting sealing material 2 that is heated in the technology of the present invention. FIG. 5 shows an example of temperature characteristics of the thermosetting sealing material in the technology of the present invention. FIG. 6 shows an example of temperature characteristics of the glass substrate and the setting characteristics of the thermosetting sealing material in the technology of the present invention. FIG. 7 shows the procedures for the discharging/depressurizing process and heating process. FIG. 8 shows a sample architecture for an actuator section that moves a sheet support member. FIG. 9 shows the series of procedures performed from the loading of the substrate to ejection.

FIG. 1 shows: a pair of glass substrates 1a, 1b for supporting the liquid crystal; a thermosetting sealing material 2 interposed between the glass substrates 1a, 1b and surrounding the region filled with liquid crystal so that the liquid crystal is sealed in; flexible heat-resistant sheets 3a, 3b; projections 4 maintaining a predetermined range for the gap between the sheets 3a, 3b at predetermined positions; a discharge opening 6 to allow air to be discharged from the space between the sheets 3a, 3b so that the space can be sealed; O-rings 7 for maintaining the sealed state of the space surrounded by the sheets 3a, 3b; sheet support members 8a, 8b, 8c, 8d movably supporting the sheets 3a, 3b; heaters 9a, 9b serving as a heat source; and a case 18 surrounding and supporting these elements. A transport mechanism of a transport device loads and aligns the two glass substrates 1a, 1b interposed by the thermosetting sealing material 2 to a predetermined position in the case 18. The sheet support members 8a, 8d support the sheet 3a and move the sheet 3a from above the glass substrate 1a toward the glass substrate 1a. The sheet support members 8b, 8c support the sheet 3b and move the sheet 3b from below the glass substrate 1b toward the glass substrate 1b. The sheets 3a, 3b are brought toward each other until the surface of the sheet 3a abuts the projection 4 on the sheet 3b. At this position, a space is formed between the sheets 3a, 3b. This space is put in a roughly sealed state, with the space surrounding the thermosetting sealing material 2 and the glass substrates 1a, 1b. The O-rings 7, which are disposed on the sheet supporting members 8b, 8c and surround the ends of the sheets 3a, 3b, keep the space surrounded by the sheets 3a, 3b in a roughly sealed state. With this roughly sealed state, a volume of air is discharged (removed) from between the sheets 3a, 3b by way of the discharge opening 6, decompressing the space.

The projections 4 are formed with heights roughly equal to the overall thickness of the compound structure formed by the glass substrates 1a, 1b. The projections 4 form a gap between the sheets 3a, 3b outside of the region defined by the glass substrates 1a, 1b. This provides an air flow path used to discharge air during decompression. This decompression results in at least a partial vacuum environment created between the sheets 3a, 3b so that the sheets are tightly abutted against the surfaces of the glass substrates 1a, 1b respectively. The glass substrates 1a, 1b are pressed together by the sheets 3a, 3b from atmospheric pressure as a result of the decompression pressure. This pressing together of the glass substrates 1a, 1b causes the thermosetting sealing material 2 to be crushed between the substrates to form a predetermined gap width. In this embodiment, electrodes, thin-film transistors (TFT), color filters, and the like are disposed between the glass substrates 1a, 1b. A spacer material provides the predetermined gap width between the substrates. It is known that the specific gap width between the substrates will depend on the liquid crystal technology in use. For example, in-plane switching mode LCD panels have a smaller gap width than twisted nematic mode TFT-LCD panels. It is understood that greater decompression of the space between the sheets 3a, 3b will increase the pressing force upon the substrates 1a, 1b and thus produce a smaller gap as compared to a lesser decompression of the space between the sheets. For current LCD panel technologies, typically the amount of decompression produces a partial vacuum between the sheets in the range of 0.4–0.95 atmospheres (absolute atm.). The lower end of the pressure range being appropriate for in-plane switching LCD panels, while the upper end of the pressure range is appropriate for twisted nematic TFT-LCD panels.

With this pressurized state, the sheets 3a, 3b, the glass substrates 1a, 1b, and the thermosetting sealing material 2 are heated from above and below by the heaters 9a, 9b, which serve as heat sources. In accordance with the invention, one or both of the heaters 9a, 9b are disposed proximate to but spaced away from the sheets 3a, 3b, and heat is transferred across the resulting space to the sheets 3a, 3b through radiation and convection. The distances (d1, d2) between the heaters 9a, 9b and the sheets 3a, 3b can be independently adjusted. The heating temperatures (T1, T2) can also be changed by independently adjusting heat generation. Also, the power supply can be turned on and off. Heating time can be reduced by having the heaters 9a, 9b heated to a predetermined temperature ahead of time before they are moved to the predetermined heating positions. The specific values for d1, d2, T1, and T2 depend on the specific materials used and operating conditions. The specific values will vary from one process to another, but are within the scope of those of ordinary skill in the relevant arts and should not require undue experimentation to determine for any given situation.

The heat from the sheets 3a, 3b is transferred to the glass substrates 1a, 1b and the thermosetting sealing material 2. The thermosetting sealing material 2, pressed between the glass substrates 1a, 1b, is heated and hardened. When heated, the thermosetting sealing material 2 begins to soften when the temperature reaches the softening point. The thermosetting sealing material 2 then hardens at a temperature range (setting range) higher than the softening range. In the softened state, the thermosetting sealing material 2 adheres to the glass substrates 1a, 1b. Thus, if the discharging process described above is performed in this softened state, there would be greater flow resistance of the air in the space between the glass substrates 1a, 1b and the sheets 3a, 3b. This would cause problems such as an increase in the time required to reach a predetermined decompression state. For this reason, the heating temperature and/or the discharging process must be controlled so that the predetermined decompression is completed (the predetermined decompression value must be reached) by the time the softening of the thermosetting sealing material 2 begins, i.e., by the time the temperature of the thermosetting sealing material 2 reaches the softening point.

It is noted that the foregoing steps of removing the air from between the sheets and heating are not necessarily performed in the order described. The steps can be performed simultaneously; e.g., the vacuum can be formed during the heating process since the thermosetting effect does not occur instantaneously.

When the thermosetting sealing material 2 hardens in the thermosetting temperature range, heating is stopped, e.g., by turning off the power supply to the heaters 9a, 9b. The heaters 9a, 9b are then moved away from the sheets 3a, 3b. Also, the discharging operation is stopped and the space surrounded by the sheets 3a, 3b is released from its decompressed state and restored to atmospheric pressure (atmospheric release). Immediately after or during this atmospheric release operation, the sheet support members 8a, 8d are moved upward and the sheet support members 8b, 8c are moved downward so that the sheet 3a is moved away from the glass substrate 1a and the sheet 3b is moved away from the glass substrate 1b. Next, the compound structure (also referred to herein variously as a work, or a workpiece) formed by the glass substrates 1a, 1b and the interposed thermosetting sealing material 2 is ejected from the case 18 by the transport mechanism of the transport device.

FIG. 2 shows: a transport device 122 for loading the work, i.e., the glass substrates 1a, 1b and the interposed thermosetting sealing material 2, in the case 18 and aligning it to a predetermined position, and also for ejecting the work from the case 18; a transport mechanism 120 in the transport device 122 is a mechanism for performing operations on the work such as loading, aligning, and ejecting; a position detector 109c detects the position and orientation of the work, the position of the transport mechanism 120, and the like; a transport controller 121 controls the operations of the transport mechanism 120 based on detection signals (position information) from the position detector 109c.

Also, a liquid crystal panel assembly device 115 is a device combined with the transport device 122. An assembly device controller 100 provides overall control over the transport device 122 and the liquid crystal panel assembly device 115. A position detector 109a detects the positions of the sheet support members 8a–8d or the sheets 3a, 3b. An actuator 108a moves the sheet support members 8a–8d. A sheet vertical controller 107 controls the actuator 108a based on the detection signal from the 109a and information from the assembly device controller 100. A pressure detector 106 detects the pressure in the space surrounded by the sheets 3a, 3b. A control valve 116 adjusts the pressure in the space surrounded by the sheets 3a, 3b. An inter-sheet pressure controller 103 controls the control valve 116 based on the detection signal from the pressure detector 106 and information from the assembly device controller 100. A compressor 104 actively supplies air by way of the control valve 116 to the space between the sheets 3a, 3b during the atmospheric release operation described with reference to FIG. 1. A decompression pump 105 discharges air from the space surrounded by the sheets 3a, 3b and decompresses this space. A heat generator 9 is the heat generator for the heaters 9a, 9b. A heater temperature measuring device 102 measures the temperature of the heat generator and outputs heater temperature information. An inter-sheet temperature measuring device 111 measures the temperature in the space surrounded by the sheets 3a, 3b and outputs temperature information. A heater temperature controller 101 controls the heat generator 9 of the heaters 9a, 9b based on control information from the assembly device controller 100 and temperature information from the heater temperature measuring device 102 and the inter-sheet temperature measuring device 111. A position detector 109b detects the positions of the heaters 9a, 9b. An actuator 108b moves the heaters 9a, 9b. A heater vertical controller 110 controls the actuator 108b based on detection signals from the position detector 109b and information from the assembly device controller 100.

The position detector 109a, the actuator 108a, and the sheet vertical controller 107 form a movement control system for the sheets 3a, 3b in the liquid crystal panel assembly device 115. The pressure detector, the control valve 116, the inter-sheet pressure controller 103, the compressor 104, and the decompression pump 105 form a pressure control system for the space surrounded by the sheets 3a, 3b. The heat generator 9, the heater temperature measuring device 102, the inter-sheet temperature measuring device 111, the heater temperature controller 101, the position detector 109b, the actuator 108b, and the heater vertical controller 110 form a heating control system. Control signals (substrate delivery signals) are passed back and forth between the assembly device controller 100 of the liquid crystal panel assembly device 115 and the transport controller 121 of the transport device 122.

In the architecture described above, the work, formed as a compound structure of the glass substrates 1a, 1b and the interposed thermosetting sealing material 2, is loaded into the case 18 of the liquid crystal panel assembly device 115 and aligned at a predetermined position by the transport mechanism 120 of the transport device 122. After the work is aligned, the actuator 108a controlled by the sheet vertical controller 107 moves the sheet support members 8a–8d so that the sheet 3a is moved downward from above the work and the sheet 3b is moved upward from below the work. The sheets 3a, 3b are stopped at predetermined positions so that the work is surrounded and a roughly sealed state is formed in the space between the sheets 3a, 3b. In this surrounded state, the decompression pump 105 of the pressure control system discharges air from the space between the sheets 3a, 3b so that the pressure in the space is decompressed to a predetermined level relative to atmospheric pressure. The pressure level in the space is adjusted by the control valve 116, which is controlled by the inter-sheet pressure controller 103 based on pressure information from the pressure detector 106. The discharge operation performed by the decompression pump 105 continues after the predetermined decompression state is reached in the space so that the predetermined decompression state can be maintained, moisture in the space can be removed, and the like. In this embodiment, the heating of the work by way of the sheets 3a, 3b can take place by controlling the positions of the heaters 9a, 9b and/or the temperature of the heat generator 9. Positioning is provided by the actuator 108b controlled by the heater vertical controller 110 based on position information from the position detector 109b. If the temperature of the heaters 9a, 9b is constant, the heating temperature applied to the work is higher when the heaters 9a, 9b are closer to the work.

Control over the temperature of the heat generator 9 is provided by the heater temperature controller 101 controlling the search profile storage file 109 based on temperature information from the inter-sheet temperature measuring device 111 and temperature information from the heater temperature measuring device 102. The heating of the work can begin after the space between the sheets 3a, 3b is in the predetermined decompressed state described above or can begin before the predetermined decompressed state is reached. If heating is to be started before the predetermined decompressed state (e.g., due to air discharge performance issues), the heater temperature controller 101 and the heater vertical controller are used to control the heating temperature and its rate of increase over time so that the softening of the thermosetting sealing material 2 between the glass substrates begins after the predetermined decompressed state is reached.

After the thermosetting sealing material 2 has been hardened to a predetermined state by the heating, the power supply to the heaters 9a, 9b is turned off and the heaters 9a, 9b are moved above the sheet 3a and below the sheet 3b respectively. The discharge operation performed by the decompression pump 105 is also turned off. The compressor 104 is used to feed air to the space between the sheets 3a, 3b to restore the space to atmospheric pressure.

Furthermore, the sheet vertical controller 107 is used to control the actuator 108a to move the sheet support members 8a–8d. The sheet 3a is moved up from the work and the sheet 3b is moved down from the work so that the sheets 3a, 3b are moved away from the glass substrates of the work and are retracted to predetermined positions. Then the processed work is ejected from the case 18 by the transport mechanism 120.

The assembly device controller 100 controls the transport controller 121, the sheet vertical controller 107, the intersheet pressure controller 103, the heater temperature controller 101, and the heater vertical controller 110 so that the following operations are performed as a series of processing steps: the work loading/alignment operation, the sheet moving operation, the discharging/decompression operation, the heater moving/heating operation and the stopping of this operation, the heater retraction operation, the stopping of the discharge operation and the atmospheric release operation, the sheet retraction operation, and the work transport operation.

FIG. 3 shows: a thin-film transistor or transparent electrode 11; a color filter 12; spacers 13; and a gap g. Liquid crystal fills the gap g. The liquid crystal is supported by the thermosetting sealing material interposed between the glass substrates 1a, 1b and hardened by the operation described above.

FIG. 4 shows states of the thermosetting sealing material 2, which is heated according to the technology of the present invention. FIG. 4(a) is a perspective drawing of the thermosetting sealing material 2 disposed on (applied to) the glass substrate 1b. FIG. 4(b) is a cross-section drawing taken along viewline x—x of the thermosetting sealing material 2 interposed between the glass substrates 1a, 1b and before the sealing material has softened. FIG. 4(c) is a cross-section drawing taken along the same viewline x—x of the thermosetting sealing material 2 interposed between the glass substrates 1a, 1b with the sealing material softened by heat. In FIG. 4(a), the line-shaped thermosetting sealing material 2 is broken at 2a and 2b where the liquid crystal is to let in.

In the state shown in FIG. 4(b), small gaps 20 are formed between the thermosetting sealing material 2 and the surface of the glass substrate 1a. When air is discharged by the decompression pump, air passes through the gaps 20 and escapes from between the sheets. When the heating temperature increases past the temperature for FIG. 4(c), where the thermosetting sealing material 2 is in a softened state, the thermosetting sealing material 2 is hardened in the state shown in FIG. 4(c), substantially eliminating gaps 20.

FIG. 5 shows an example of temperature increase characteristics of the thermosetting sealing material according to the technology of the present invention. The horizontal axis represents heating time and the vertical axis represents the temperature of the sealing material. For example, in the first embodiment of the present invention, the heaters 9a, 9b are positioned away from the sheets 3a, 3b, the glass substrates 1a, 1b, and the thermosetting sealing material 2 and heat is transferred to the sheets 3a, 3b through radiation and convection by way of the space formed. Thus, compared to a method in which a heater is placed in direct contact with the heated objects, the increase in the temperature of the thermosetting sealing material is more gradual and the time to reach the softening point of the sealing material is longer. Also, the heat is transferred more uniformly to the glass substrates 1a, 1b and the thermosetting sealing material 2 and temperature gradients are reduced. The lengthening of the time required to reach the softening point allows the decompression of the space between the sheets 3a, 3b to take place more reliably before the softening of the sealing material. The uniform transfer of heat reduces problems such as shifting and deformation, e.g., warping. Also, discrepancies such as localized hardening or softening can be prevented.

FIG. 6 shows sample temperature increase characteristics of the glass substrates 1a, 1b and hardening characteristics of the thermosetting sealing material 2. Heat from the heaters is transferred by radiation and convection to the glass substrates 1a, 1b and the interposed thermosetting sealing material 2 by way of the sheets 3a, 3b so that the temperature increases gradually over time. The substrate temperature increases to a temperature T2 at which the thermosetting sealing material 2 hardens (the seal setting point) (elapsed time t2 (seal setting time)). The hardness of the thermosetting sealing material 2 decreases temporarily as the temperature of the sealing material increases and becomes fluid. When the temperature reaches a softening point T1 (elapsed time t1 (seal softening time)), the sealing material softens (hardness decreases) and becomes fluid, with the hardness continuing to decrease until a certain temperature is reached. Then, as the temperature increases, hardness begins to increase. As the temperature exceeds the softening point T1, the sealing material loses its fluidity and gradually hardens.

FIG. 7 shows the procedure for the discharging/decompression operation and the heating operation corresponding to the characteristics shown in FIG. 6.

In FIG. 7, air is discharged from the space between the sheets (S4). The decompression in the space is measured (S4-1). If the decompression level is at or higher than a predetermined value P, the heaters are brought close (S5) and the heating process is begun. In the heating process, heat is applied for at least the seal setting time t2, the decompression level in the space between the sheets is confirmed, and the temperature of the glass substrates is measured (S5-1). When the temperature is at or above the seal setting point T2, the heaters are retracted (S7). If heating is begun during the discharging operation, the decompression level of the space between the sheets is measured (S4-1) and if the decompression level not reached the predetermined value P, the glass substrate temperature is measured (S4-2) and air in the space between the sheets is discharged again only if the temperature has not reached the seal softening point T1. If the temperature has already reached the seal softening point T1, the glass substrates are assumed to be defective and ejected.

FIG. 8 shows a sample structure for an actuator used to move the sheet support members.

FIG. 8 shows the structure of the actuator for the support member 8b, which is one of the sheet support members 8a–8d. The actuators for the other support members are similar to this one. FIG. 8 shows a member 17 secured to the sheet support member 8b, a hole 14 formed on the member, a pin 15 engaging with the hole 14 while forming a gap particularly along the horizontal axis in the figure, a member 19 on which the pin 15 is disposed, a support member 16 supporting the member 19, a rod-shaped member 10 having a threaded surface (e.g., a screw conveyer) to allow the support member 16 having a complementary threaded interior surface to move through rotation of member 10. After the heating of the work (the compound structure formed from the glass substrates and the interposed thermosetting sealing material) is completed and the heaters are retracted, the sheets 3a, 3b are moved away from the work. During this operation, the rod-shaped member 10 is rotated so that the support member 16 is moved downward in the figure, thus causing the sheet support member 8b is moved downward in the figure. At this time, at the sheet support member 8c supporting the sheet 3b, the corresponding rod-shaped member is not rotated and the downward motion of the support member 16 is not begun. Thus, the sheet 3b begins its move away from the work starting with the section toward the sheet support member 8b. Once the sheet support member 8b has been lowered to a predetermined position, the rotation of the rod-shaped member 10 at the sheet support member 8b is stopped so that the motion of the sheet support member 8b is stopped. Next, the rod-shaped member at the sheet support member 8c is rotated and the support member is moved so that the sheet support member 8c is lowered and the section of the sheet 3b at the sheet support member 8c is moved away from the work. When the sheet support member 8c has been lowered to roughly the same position as the sheet support member 8b, the rod-shaped member 10 of the sheet support member 8b is rotated again to begin downward motion of the sheet support member 8b, thus allowing the sheet support member 8b and the sheet support member 8c to be moved downward together to a predetermined position. The same operations take place at the sheet support members 8a, 8d supporting the sheet 3a. This structure allows the sheets to be easily moved away from the work.

FIG. 9 shows an example of the sequence of operations performed from the loading of the substrates (work) to ejection.

In FIG. 9, the work, the compound structure formed by the glass substrates and the interposed thermosetting sealing material, is loaded into the case by the transport mechanism at step S1. At step S2, the work is aligned to a predetermined position. At step S3, the sheets are moved so that the work is surrounded in a roughly sealed state. At step S4, air is discharged from the roughly sealed space so that the atmospheric pressure applies a load to the glass substrates of the work due to the decompressed state of the space relative to atmospheric pressure. At step S5, heaters are moved toward the work from either side. At step S6, the sheets are heated from a predetermined distance away so that the is transferred to the work between the sheets and the thermosetting sealing material between the glass substrates of the work is hardened. At step S7, heating is stopped, e.g., by turning off the heater power supply, after the thermosetting sealing material is hardened, and the heaters are moved away from either side of the work. At step S8, the space surrounded by the sheets is released from a decompressed state and restored to atmospheric pressure (atmospheric release). At step S9, the sheets are moved away from the work as a result of the motion of the sheet support members. At step S10, the work, in which the thermosetting sealing material is hardened between the glass substrates, is ejected from the case by the transport mechanism. These steps result in the formation of a composite structure for a glass substrate for holding liquid crystal in a predetermined gap. In the above, the heating operation at step S6 can be begun after the pressure in the space between the sheets has been lowered to a predetermined decompression level at step S4. Alternatively, the heating can be begun before the predetermined decompression level is reached.

With the first embodiment described above, air can be reliably and efficiently discharged from the space between the sheets, thus allowing the sealing material to be processed quickly and providing improved production efficiency for liquid crystal panels. Also, uniform pressurizing can be performed on the glass substrate and the sealing material, and heater temperature discrepancies can be limited to provide uniform heating. This prevents shifting and warping of the glass substrate and provides a uniform gap between the substrates so that high-quality liquid crystal panels can be provided. Also, hardness characteristics of the sealing material can be easily controlled. Also, if substrate area is increased, the increase in the size of the device can be limited. Also, the sheets can be easily moved away from the glass substrates.

Figure 10:
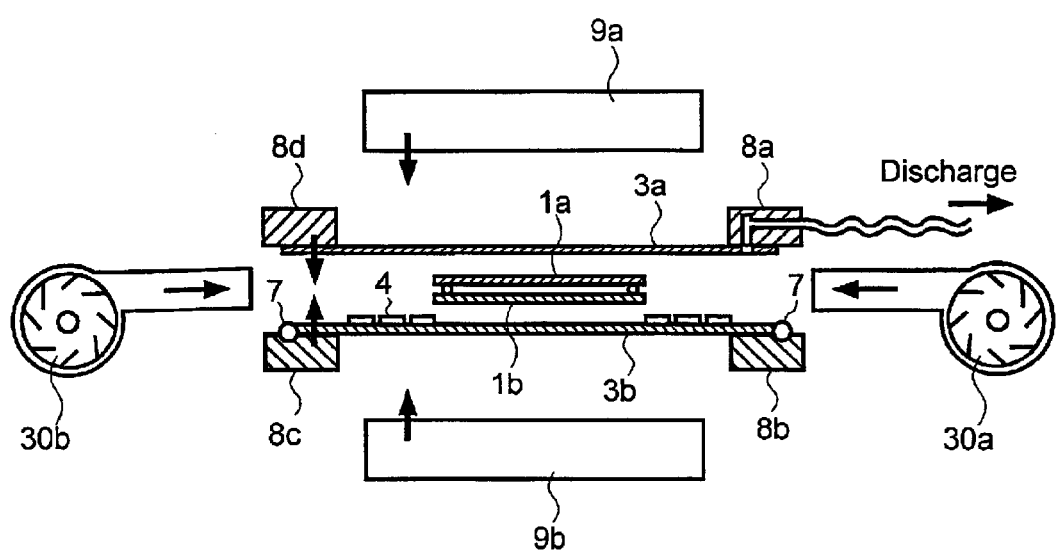
FIG. 10 is a drawing showing a second embodiment of the present invention.

FIG. 10 shows a second embodiment of a liquid crystal panel production device according to the present invention.

The second embodiment provides an example of an architecture in which fans are disposed to serve as cooling means for cooling the sheets. The case surrounding the entire structure is not shown in the figure. In FIG. 10, fans 30a, 30b blow cool air into the space between the sheets. The fans 30a, 30b blow air when the sheets 3a, 3b are moved away from the glass substrates 1a, 1b respectively. The timing and volume of blowing operations can be controlled independently for each fan. Other structures and operations are roughly identical to those of the first embodiment described above.

With the second embodiment, the sheets 3a, 3b can be actively cooled so that the temperature of the sheets tightly abutting the glass substrates can be lowered when decompressing the space between the sheets. If the temperature of the sheets is too high, the sealing material between the glass substrates can soften before the space reaches the predetermined decompression level, making proper decompression difficult. However, with this embodiment, this problem can be reliably avoided. Other operations and advantages are similar to those of the first embodiment described above.

Figure 11:
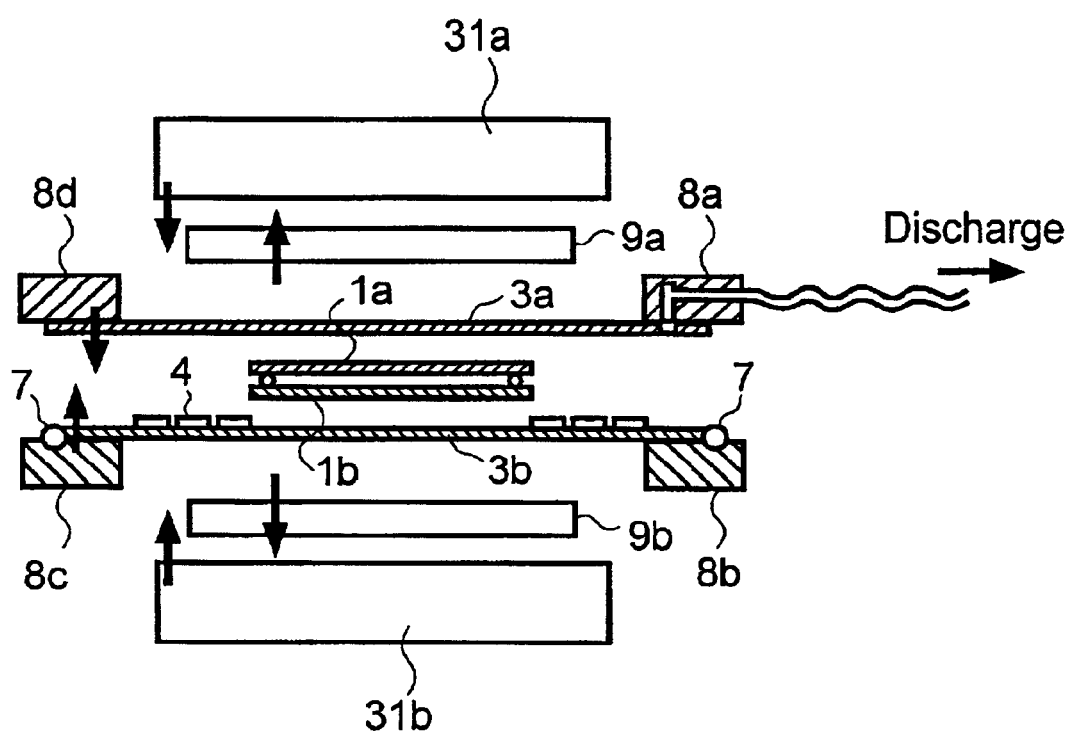
FIG. 11 is a drawing showing a third embodiment of the present invention.

FIG. 11 shows a third embodiment of a liquid crystal panel production device according to the present invention.

In the third embodiment, cooling means are disposed above and below the heaters. The case surrounding the entire structure is not shown in FIG. 11. In FIG. 11, cooling means 31a, 31b are placed close to or abutting the heaters 9a, 9b to cool the heaters. After the heating operation is completed, the power supply to the heaters 9a, 9b is turned off and cooling means are brought to a position close to or abutting the heaters. If the sheets 3a, 3b are positioned close to or abutting the heaters 9a, 9b, the sheets 3a, 3b can also be cooled via the heaters 9a, 9b. Cooling means can involve metal plates, a water-cooling system, or some other cooling system. Other structures and operations are roughly identical to those of the first embodiment described above.

With the third embodiment, the heaters 9a, 9b can be actively cooled and the work for which the heating operation has been completed can be ejected from the case in a cooled state. If a new work is loaded into the case to be heated, the sealing material between the glass substrates is prevented from softening too early. Also, the transport mechanism that ejects and loads works is able to operate in a cool environment. Other operations and advantages are similar to those of the first embodiment described above.

It is also possible to use both sheet cooling means from the second embodiment and heater cooling means from the third embodiment.

In the present invention, heating means (heaters) are not restricted to the structure described above. For example, a structure that blows heated air or the like can be used.

Figure 12:
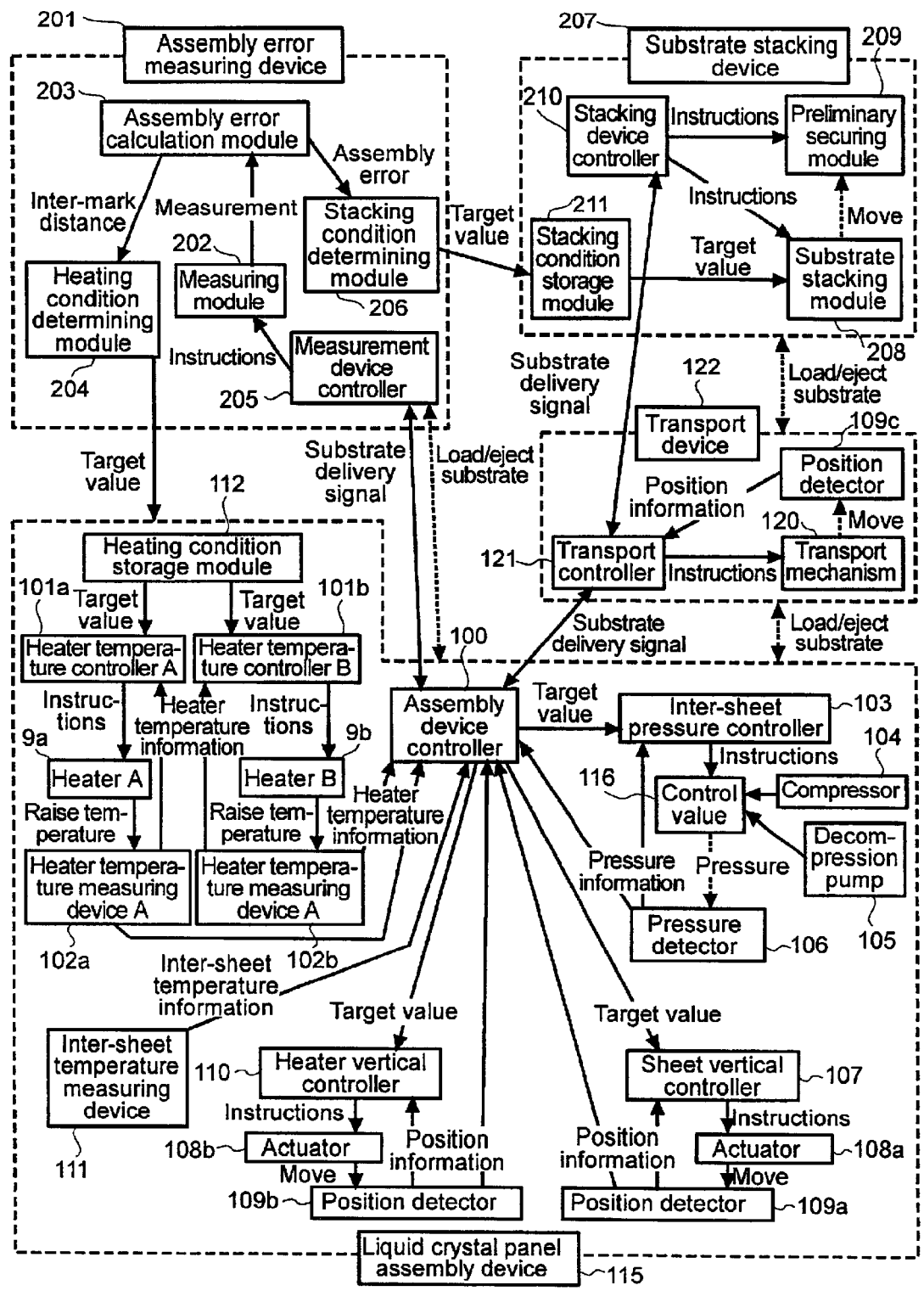
FIG. 12 is a drawing showing a fourth embodiment of the present invention.

FIG. 12 shows a block diagram of a sample architecture of a control system for a liquid crystal panel production device equipped with an assembly error measuring device and a substrate stacking device according to a fourth embodiment of the present invention. An assembly error measuring device 201 measures assembly precision of liquid crystal panels assembled by the liquid crystal panel assembly device 115. A measuring module 202 measures relative positioning errors of alignment marks. An assembly error calculation module 203 calculates liquid crystal panel assembly error from the relative positioning errors for multiple alignment marks. A heating condition determining module 204 determines heating conditions from the assembly error for the liquid crystal panel. A measurement device controller 205 controls these elements. Also shown are: a stacking condition determining module 206; a substrate stacking device 207 for aligning and stacking two glass substrates; a substrate stacking module 208; a preliminary securing module 209; a stacking device controller 210; and a stacking condition storage module 211. As described above, the liquid crystal panel is formed from the two glass substrates 1a, 1b.

Alignment marks are disposed on each of these glass substrates. The alignment marks are formed at the same time as the thin-film transistor or transparent electrode 11 or the color filter 12. Overlapping marks indicate an assembly error of 0 for the liquid crystal panel. The substrate stacking module 208 of the substrate stacking device 207 uses the alignment marks to stack the two glass substrates in relative alignment to each other. When doing this, alignment is performed to achieve the target value obtained from the stacking condition storage module 211 so that the final assembly error is minimized. The substrates are loosely secured by the preliminary securing module 209 and transported to the liquid crystal panel assembly device 115.

In the liquid crystal panel assembly device 115, a heating condition storage module 112 stores heating conditions. When assembling the liquid crystal panel, the assembly device controller 100 reads heating conditions from the heating condition storage module 112 and provides target values to heater temperature controllers 101a, 101b. These target values are used to independently control the temperatures and the distance from the glass substrates of the heaters 9a, 9b. Structures and operations for other sections are roughly similar to those of the first embodiment.

Once the liquid crystal panel is assembled, it is loaded into the assembly error measuring device 201. The assembly error measuring device 201 uses the measuring module 202 to measure the relative alignment errors of the alignment marks. Generally, multiple sets of alignment marks are measured, and the assembly error calculation module 203 uses the relative alignment errors of these alignment marks to calculate the relative assembly error and inter-mark distance for the entire liquid crystal panel through a least-squares method or the like. The heating condition determining module 204 determines heating conditions based on the calculated inter-mark distance and stores these conditions in the heating condition storage module 112. The stacking condition determining module 206 determines stacking conditions from the relative assembly error for the entire liquid crystal panel and saves these conditions to the stacking condition storage module 211.

Figure 13:
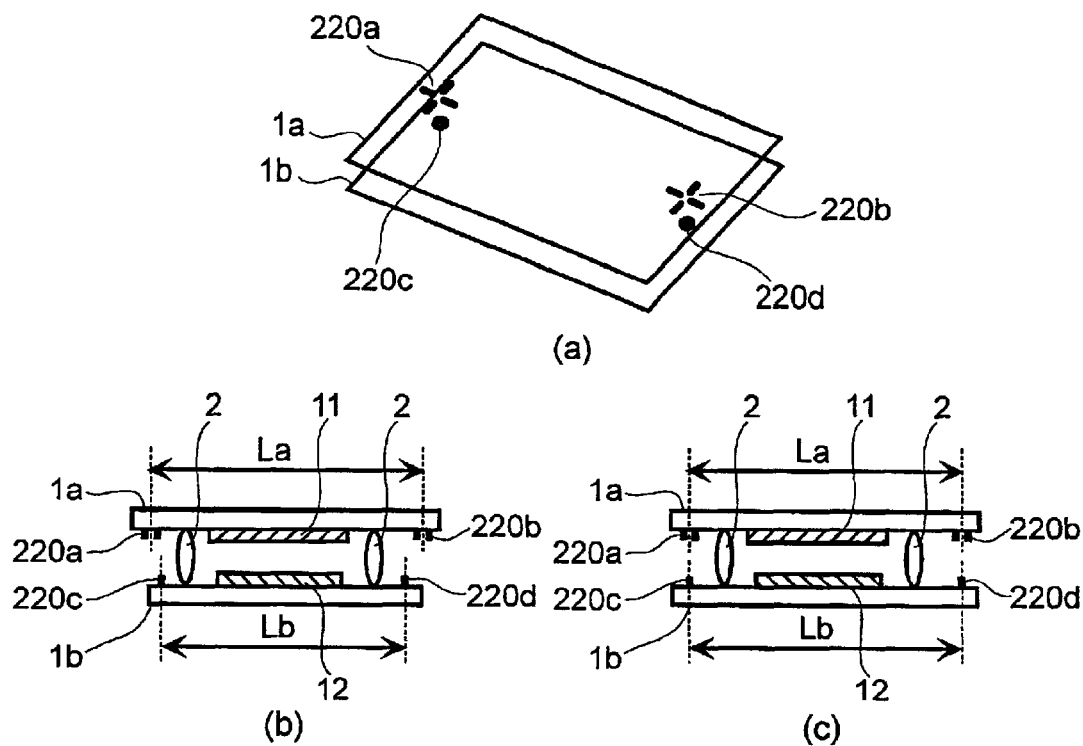
FIG. 13 is a drawing illustrating the advantages of the differential heating provided in the present invention.

FIG. 13 shows a liquid crystal panel in an assembled state. FIG. 13(a) is a perspective drawing of an assembled liquid crystal panel. FIG. 13(b) is a cross-section drawing of the glass substrates 1a, 1b when heated uniformly. FIG. 13(c) shows a cross-section drawing when the heating temperature for the glass substrate 1b is higher than the heating temperature for the glass substrate 1a. When the liquid crystal panel is assembled, the two glass substrates are stacked so that alignment marks 220a, 220b on the glass substrate 1a are aligned with the alignment marks 220c, 220d on the glass substrate 1b, as shown in FIG. 13 (a). In FIG. 13(b), La indicates the distance between the alignment marks 220a, 220b, and Lb indicates the distance between the alignment marks 220c, 220d. During the assembly of the liquid crystal panel, there is a heating process for hardening the sealing material 2. Since films with different characteristics are formed, e.g., the thin-film transistor or the transparent electrode 11 on the surface of the glass substrate 1a, the color filter 12 on the surface of the glass substrate 1b, the substrates will have different thermal expansion coefficients. As a result, when the glass substrates 1a, 1b are heated uniformly, there will be different values for the inter-mark distances La, Lb. For example, when heat is applied uniformly and the inter-mark distance La is greater than the inter-mark distance Lb, as shown in FIG. 13(b), this error can be eliminated by using a higher heating temperature for the glass substrate 1b compared to the glass substrate 1a so that the glass substrate 1b is expanded more than the glass substrate 1a. The result would be that the difference between the inter-mark distances La, Lb would be "0", as shown in FIG. 13(c). In this example, two pairs of alignment marks are shown, but inter-mark distance errors can be determined by using more alignment marks.

Figure 14:
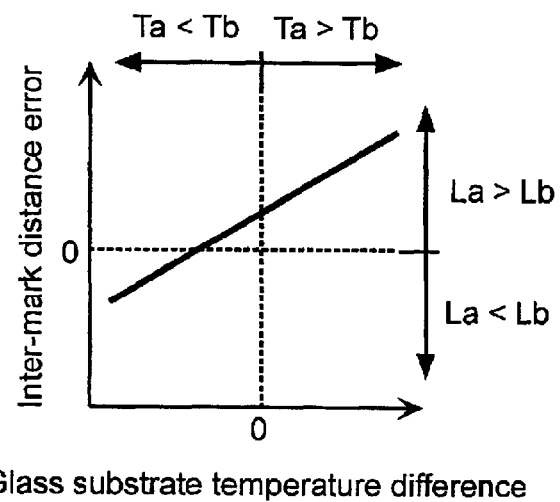
FIG. 14 is a drawing illustrating inter-mark distance error characteristics resulting from differential heating according to the present invention.

FIG. 14 shows an example of how inter-mark distance errors change according to the difference in heating temperature between the glass substrates 1a, 1b. The horizontal axis represents the difference in heating temperatures applied to the glass substrates 1a, 1b. The vertical axis represents the inter-mark distance error. The heating temperature distance here is defined as the temperature for the glass substrate 1b subtracted from the temperature for the glass substrate 1a, resulting in a positive value if the temperature of the glass substrate 1a is higher than the temperature of the glass substrate 1b. The inter-mark distance error here is defined as the inter-mark distance Lb of the glass substrate 1b subtracted from the inter-mark distance La of the glass substrate 1a, resulting in a positive value if the inter-mark distance La is greater than the inter-mark distance Lb. In the example shown in FIG. 14, uniform heating, i.e., a heating temperature difference of "0", results in a positive inter-mark distance error, i.e., the inter-mark distance La is greater than the inter-mark distance Lb. This corresponds to FIG. 13(a). If the heating temperature for the glass substrate 1b is increased, i.e., the heating temperature distance is made negative, the inter-mark distance error can be "0". This heating temperature can be stored in the heating condition determining module 204.

Device discrepancies and variations in the process for forming the thin-film transistor or the transparent electrode 11 or the color filter 12 can prevent the inter-mark distance error from being "0" even if the value stored in the heating condition determining module 204 is used as the heating temperature. In this case, the relationship shown in FIG. 14 can be used to calculate a heating temperature difference that can reduce the inter-mark distance error. An equation or table that represents the relation shown in FIG. 14 can be stored in the heating condition determining module 204 to provide heating conditions more up-to-date than those determined by the inter-mark distance error calculated at the assembly error calculation module 203.

Figure 15:
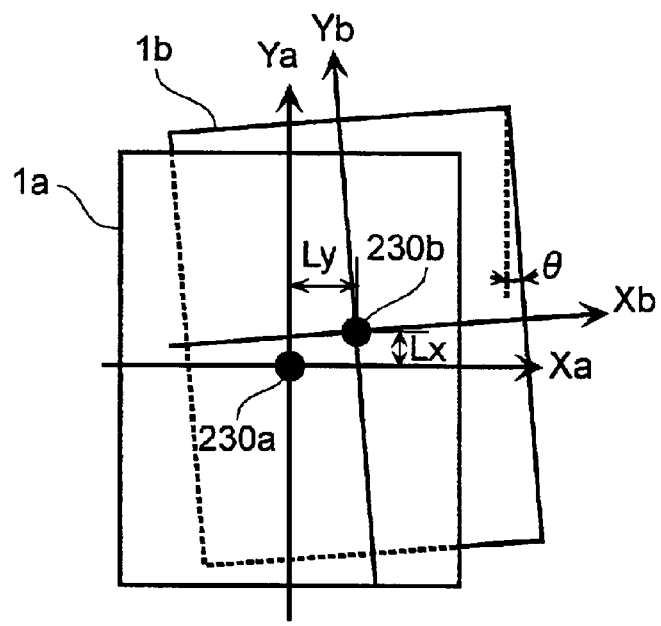
FIG. 15 illustrates another example showing a liquid crystal panel in an assembled state according to the present invention.

FIG. 15 illustrates the coordinate system definition on the liquid crystal panel. A center of gravity 230a is the center of gravity for the glass substrate 1a and a center of gravity 230b is the center of gravity of the glass substrate 1b. Using the centers of gravity 230a, 230b of the glass substrates as the origin, an X axis is defined parallel to the short side of the glass substrates and a Y axis is defined parallel to the long side of the glass substrates. Assembly error for the liquid crystal panel is evaluated using these coordinates. The offset of the glass substrate 1b relative to the glass substrate 1a is indicated by a center of gravity position error (Lx, Ly) and an angular error theta. The following description of liquid crystal panel assembly error will be based on this coordinate system.

Figure 16:
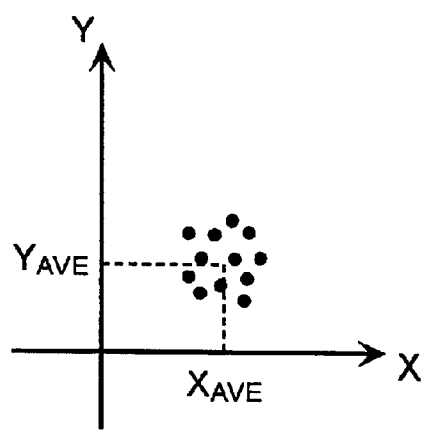
FIG. 16 is a drawing illustrating assembly error in the present invention.

FIG. 16 shows an example of measurement results for the center of gravity 230b on the glass substrate 1b as measured by the assembly error measuring device 201. As shown in FIG. 16, there is variation in the center of gravity positions, but if the glass substrate 1b is stacked with an offset so that the average values Xave, Yave are "0", the liquid crystal panel assembly error can be minimized. The same applies to the slope theta of the glass substrates. By storing the measurement data in the stacking condition determining module 206, e.g., by determining an average value from the past twenty data points, and storing a stacking offset value to the stacking condition storage module 211, the offset can be used when stacking the substrates.

With the fourth embodiment, inter-mark distance errors caused by heating can be reduced. Also, by measuring assembly errors after liquid crystal panels are assembled, stacking conditions and heating conditions can be dynamically updated for the assembly of subsequent liquid crystal panels. As a result, production efficiency and quality can be improved for the liquid crystal panels.

Figure 17:
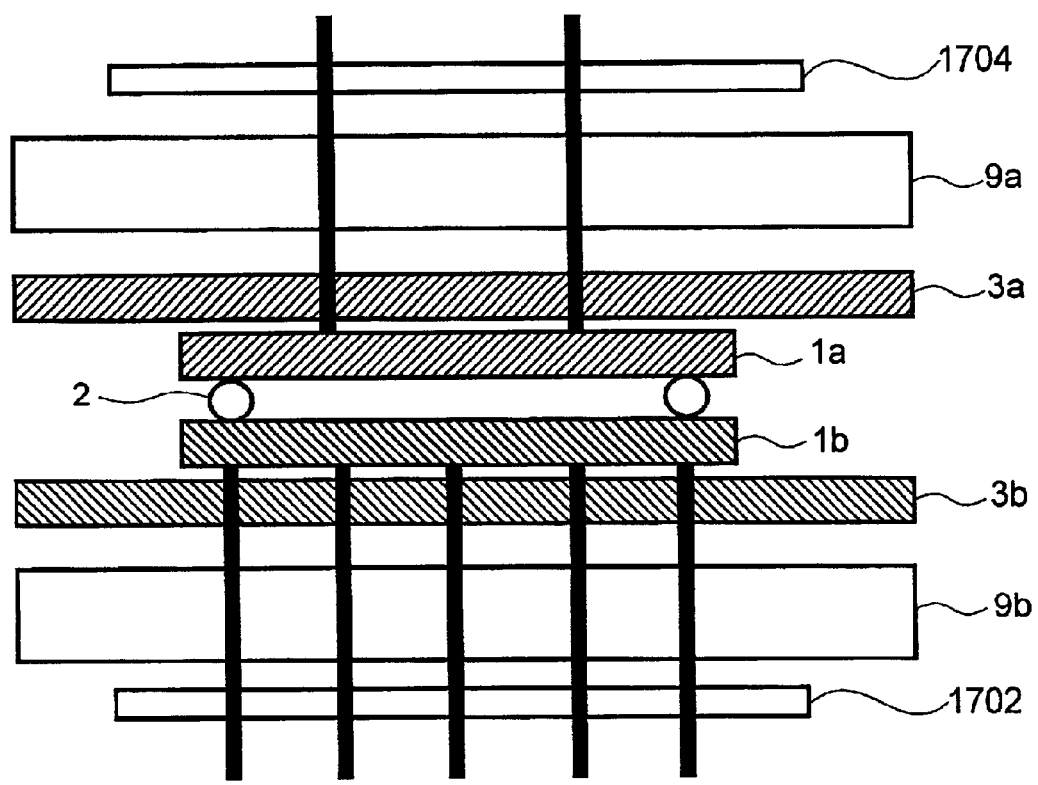
FIG. 17 shows an aspect of the invention illustrating supporting pins.

FIG. 17 shows an additional aspect of the invention in another illustrative embodiment of the glass substrate processing module disclosed in FIG. 1. Here, only a portion of the module of FIG. 1 is shown to highlight the additional aspect of the invention. The dimensions are shown exaggerated to facilitate the discussion.

A pair of glass substrates 1a, 1b and the thermosetting sealing material 2 are shown. The flexible sheets 3a, 3b are shown abutting the glass substrates 1a, 1b. At least one of the heaters 9a, 9b is positioned in spaced apart relation from the flexible sheets 3a, 3b. A plurality of pins 1702 are provided through openings in the flexible sheets 3a, 3b and in the heaters 9a, 9b.

As can be seen the pins 1702 are positioned to contact a surface of the glass substrate 1b. The pins support the glass substrate in a way to prevent any sagging that may occur during processing due to the combined softening effect of heating and the force of gravity.

In another embodiment, pins 1704 may be provided in addition to pins 1702. The additional pins 1704 may cooperate with pins 1702 to prevent warping effects of the glass substrates 1a, 1b during processing.

According to the present invention, uniform heat and pressure can be applied to the glass substrates and sealing material used to hold liquid crystal. This prevents offsets and warping of the glass substrates and provides high-quality liquid crystal panels. Also, processing time is reduced and production of liquid crystal panels is improved.

The present invention offers the following benefits: 1) allows the glass substrates and sealing material to be heated quickly while providing adequate discharge of air; 2) provides uniform heating of the glass substrates and the sealing material; 3) prevents shifting and warping of the substrates and limits variations in the gap between the substrates; 4) limits increases in the size of the device even when the substrate area is increased; and the like.

What is claimed is:

1. A method for producing a liquid crystal panel for containing a liquid crystal material:

providing a work comprising a first substrate and a second substrate in opposed relation to said first substrate, a thermosetting sealing material being disposed between said first and second substrates, wherein said first and second substrates each includes two or more alignment marks;

disposing said work between two sheets;

removing a volume of air from between said two sheets, thereby creating a decompression state so that said first and second substrates are subject to a pressing force by said two sheets;

upon reaching a predetermined decompression state, subjecting said two sheets and said work to an amount of heat produced from a first heater and a second heater, including disposing either said first heater proximate to and spaced apart from a first sheet of said two sheets or said second heater proximate to and spaced apart from a second sheet of said two sheets;

producing a distance error value based on a difference between a separation distance (La) of said alignment marks on said first substrate and a separation distance (Lb) of said alignment marks of said second substrate; and adjusting said first heater and said second heater so that said distance error value is reduced, wherein said first heater can be adjusted independently of said second heater.

2. The method of claim 1 wherein said providing a work includes applying said thermosetting sealing material to said first substrate, subjecting said first substrate and said thermosetting sealing material to heat followed by a cooling period, and disposing said second substrate atop said thermosetting sealing material.

3. The method of claim 1 wherein a first temperature is not equal to a second temperature.

4. The method of claim 1 wherein both said first heater and said second heater are disposed proximate to and spaced apart said sheets.

5. The method of claim 1 wherein said first heater is spaced apart from said first sheet by a first predetermined distance and said second heater is spaced apart from said second sheet by a second predetermined distance determined independently of said first predetermined distance.

6. The method of claim 5 wherein said first predetermined distance is not equal to said second predetermined distance.

7. The method of claim 1 wherein said step of removing a volume of air and said step of subjecting said two sheets and said work to an amount of heat are performed substantially at the same time.

8. The method of claim 1 wherein said providing includes applying a pattern of said thermosetting sealing material on one of said first and second substrates.

9. The method of claim 1 wherein at least one of said first and second substrates includes a plurality of semiconductor components formed on a major surface thereof.

10. The method of claim 1 further including supporting a major surface of one of said substrates to prevent sagging of said work during heating of said work.

11. A method for making liquid crystal panels, each liquid crystal panel comprising a first substrate and a second substrate spaced apart from said first substrate by a pattern of thermosetting sealing material, said first and second substrates each having two or more alignment marks, said method comprising:

(a) receiving a first liquid crystal panel as a workpiece, including determining an offset distance (La) between two of said alignment marks on said first substrate and determining an offset distance (Lb) between two of said alignment marks on said second substrate;

(b) pressing together said first and second substrates with a pressing force;

(c) positioning a first heater in opposed relation to a major surface of said first substrate, said first heater spaced apart from said major surface of said first substrate by a first distance;

(d) positioning a second heater in opposed relation to a major surface of said second substrate, said second heater optionally spaced apart from said major surface of said second substrate by a second distance;

(e) heating said workpiece by producing heat at a first temperature from said first heater and by producing heat at a second temperature from said second heater, including adjusting said temperatures based on a difference between La and Lb, wherein said first temperature is determined independently of said second temperature (f) removing said workpiece;

(g) receiving a second liquid crystal panel as a second workpiece; and (h) repeating said steps (b) through (f) with said second workpiece.

12. The method of claim 11 wherein said first temperature is different from said second temperature.

13. The method of claim 11 wherein said first distance is different from said second distance.

14. The method of claim 11 wherein said step (b) includes contacting a first sheet with said major surface of said first substrate, contacting a second sheet with said major surface of said second substrate, providing a substantially airtight seal between said first and second sheets, and removing an amount of air from between said first and second sheets.

15. The method of claim 14 wherein said step (f) includes cooling said first and second sheets.

16. The method of claim 15 wherein said cooling said first and second sheets includes forcing air across said first and second sheets.

17. The method of claim 14 wherein said step (e) includes cooling said first and second sheets to lower the temperature of said workpiece, thereby extending the time required for said thermosetting sealing material to attain a fluidic state.

18. The method of claim 11 wherein said step (f) includes cooling said first and second heaters to a temperature below which said thermosetting sealing material becomes fluidic.

19. The method of claim 18 wherein said cooling includes applying cooling plates to said heaters.

20. The method of claim 11 further including supporting a major surface of one of said substrates to prevent sagging of said workpiece during heating of said workpiece.

21. A method for producing a liquid crystal panel comprising:

providing first and second substrates;

depositing a pattern of thermosetting sealing material on said first substrate;

positioning said second substrate in opposed relation to said first substrate whereby said pattern of thermosetting sealing material is disposed between said first and second substrates, said first and second substrates and said pattern of thermosetting sealing material constituting a work;

disposing said work between two sheets;

removing a volume of air from between said two sheets, thereby creating a decompression state so that said first and second substrates are subject to a pressing force by said two sheets; and upon reaching a predetermined decompression state, subjecting said two sheets and said work to an amount of heat produced from a first heater and a second heater, including disposing said first heater proximate to and spaced apart from a first sheet of said two sheets, disposing said second heater proximate to and spaced apart from a second sheet of said two sheets, producing heat at a first temperature from said first heater, and producing heat at a second temperature from said second heater, wherein said first substrate includes at least two alignment marks having a separation distance La, wherein said second substrate includes at least two alignment marks having a separation distance Lb, wherein said first temperature and said second temperature are determined independently of each other and are based on a difference between La and Lb.

22. The method of claim 21 further including forming semiconductor elements on either or both of said first and second substrates.

23. The method of claim 21 further including repeating said steps with third and fourth substrates, including a step of cooling said first and second heaters prior to disposing said third and fourth substrates between said two sheets.

24. The method of claim 21 wherein said first temperature is not equal to said second temperature.

25. The method of claim 21 wherein said first heater is spaced apart from said first sheet by a distance different from a distance separating said second heater from said second sheet.

26. A method for producing a liquid crystal panel comprising:

providing first and second substrates;

depositing a pattern of thermosetting sealing material on said first substrate;

subjecting said first substrate and said thermosetting sealing material to heat;

allowing said first substrate and said thermosetting sealing material to cool for a period of time;

positioning said second substrate in opposed relation to said first substrate whereby said pattern of thermosetting sealing material is disposed between said first and second substrates, said first and second substrates and said pattern of thermosetting sealing material constituting a work;

disposing said work between two sheets;

producing a pressing force by said two sheets so that said first and second substrates are pressed together by said pressing force; and subjecting said two sheets and said work to an amount of heat produced from a first heater and a second heater, including disposing either said first heater proximate to and spaced apart from a first sheet of said two sheets or said second heater proximate to and spaced apart from a second sheet of said two sheets, producing heat at a first temperature from said first heater, and producing heat at a second temperature from said second heater, wherein said step of producing a pressing force includes removing a volume of air from between said sheets and said substrates to achieve a predetermined decompression state, said predetermined decompression state being achieved before said thermosetting sealing material reaches a softening point, wherein said first substrate includes at least two alignment marks having a separation distance La, wherein said second substrate includes at least two alignment marks having a separation distance Lb, wherein said first temperature and said second temperature are determined independently of each other and are based on a difference between La and Lb.

27. The method of claim 26 further including forming semiconductor elements on either or both of said first and second substrates.

28. The method of claim 26 further including repeating said steps with third and fourth substrates, including a step of cooling said first and second heaters prior to disposing said third and fourth substrates between said two sheets.

29. The method of claim 26 wherein said first temperature is not equal to said second temperature.

30. The method of claim 26 wherein said first heater is spaced apart from said first sheet by a distance different from a distance separating said second heater from said second sheet.

31. A system for producing liquid crystal panels comprising:

means for receiving a first liquid crystal panel as a workpiece, comprising first and second substrates spaced apart by thermosetting sealing material, said first and second substrates each having two or more alignment marks, wherein at least two alignment marks on said first substrate have a separation distance La, wherein at least two alignment marks on said second substrate have a separation distance Lb;

means for pressing together said first and second substrates;

first heating means for producing heat;

second heating means for producing heat;

means for positioning said first heating means in opposed relation to a major surface of said first substrate, said first heating means being spaced apart from said major surface of said first substrate by a first distance;

means for positioning said second heating means in opposed relation to a major surface of said second substrate;

means for controlling said first and said second heating means to heat said workpiece by producing heat at a first temperature from said first heating means and by producing heat at a second temperature from said second heating means, wherein said first temperature and said second temperature are determined independently of each other and are based on a difference between La and Lb; and means for removing said workpiece.

32. The system of claim 31 further including means for cooling said first and second heating means, said means for cooling being configured to cool said first and second heating means during removal of said workpiece by said removing means.

33. The system of claim 32 wherein said means for cooling is configured to cool said first and second heating means about the time during removal of said workpiece by said removing means so that a subsequent workpiece is not subjected to heat above that which would cause softening of thermosetting sealing material in said subsequent workpiece.

34. The system of claim 31 wherein said second heating means is spaced apart from said major surface of said second substrate by a second distance.

35. The system of claim 34 wherein said first distance is determined independently of said second distance.

36. The system of claim 31 further including means for supporting said workpiece to prevent sagging of said workpiece during heating thereof by said first and second heating means.

37. The system of claim 31 wherein said means for pressing includes means for sealing said workpiece within a volume of space defined by a pair of flexible sheets and means for discharging an amount of air from said volume of space.

* * * * *